Patented Apr. 30, 1946

2,399,349

UNITED STATES PATENT OFFICE 2,399,349

PRODUCTION OF FUMARODINITRILE

Carroll A. Hochwalt, Dayton, Ohio, assignor to Monsanto Chemical Company, St. Louis, Mo., a corporation of Delaware No Drawing. Application April 4, 1945,
Serial No. 586,627

5 Claims. (Cl. 260—464)

The present invention relates to an improved method for the production of fumarodinitrile by the reaction of di-iodoethylene with cuprous cyanide.

The preparation of fumarodinitrile by reaction of cuprous cyanide and di-iodoethylene has been described by Jennen (Bull. Classe Sci. Acad. roy. Belg. 22, 1169–1184 (1936)) who obtained, after 14 hours at a temperature of 135° C. to 140° C., only about a 30% yield of fumarodinitrile. The only other previously reported method for the preparation of the dinitrile is that reported by Keiser and Kessler (American Chemical Journal 46, 523–28 (1911)) and more recently by DeWolfe and Van deStraete (Bull. Sci. Acad. roy. Belg. 21, 216–25 (1935)). This method involves dehydration of fumaramide by large amounts of phosphorus pentoxide. For example, in order to dehydrate 8 g. of fumardiamide, the latter workers employed 22 g. of phosphorus pentoxide. Since the phosphorus pentoxide cannot be recovered as such from the reaction mixture, a process which involves so large a quantity of this substance is very costly and therefore is of little interest as a commercial method. Moreover, the dehydration of fumardiamide to fumarodinitrile is difficult to control when operating on a large scale.

Because fumarodinitrile is employed for the production of certain resinous materials, it is important to prepare the dinitrile in much better yields than those reported by Jennen and more economically than prepared by DeWolfe and Van deStraete. Accordingly, the object of the present invention is the production of fumarodinitrile by a technically feasible method.

As far as recovery of reactants is concerned, the method of Jennen, involving reaction of di-iodoethylene and cuprous cyanide, is to be recommended because it involves substantially no loss of raw material. As previously pointed out, however, the low conversions hitherto obtained in this process have made this method of only theoretical interest.

Now I have found that by employing certain materials as catalysts in the reaction of di-iodoethylene and cuprous cyanide, I am able to obtain with a reaction time of about 14 hours, conversions to fumarodinitrile ranging up to, say, 75% based on the di-iodoethylene. As catalysts I employ any organic tertiary amine such, for example, as pyridine, tributylamine, triethylamine, quinoline, a dialkyl-N substituted aniline such as dimethylaniline or diphenylaniline, or a mixture thereof. The use of such basic materials as catalysts for this reaction is somewhat surprising in view of the fact that fumarodinitrile is known to be readily decomposed by certain other basic materials. Thus, Jennen reports that fumarodinitrile is decomposed either by sodium carbonate or sodium hydroxide. That organic basic reacting materials such as the tertiary amines herein disclosed effect little or no decomposition of the fumarodinitrile and act instead to promote the conversion to the desired dinitrile is surprising and could not have been expected from the prior art. Accordingly the process of the present invention is desirably carried out in the absence of inorganic bases.

While even very small amounts of the tertiary amine have been found to show a beneficial influence on the reaction I have found that quantities of the tertiary amine in amounts of from, say, 1% to 5%, based on the total weight of the reaction mixture, are most advantageously employed. The reaction is preferably carried out at temperatures somewhat above room temperature and I have found that optimum temperatures range from, say, 100° C. to 180° C. and preferably from 130° C. to 170° C. The invention is further illustrated, but not limited by the following examples:

*Example 1*

A mixture consisting of 20 drops of pyridine, 105 g. of cuprous cyanide and 150 g. of trans-di-iodoethylene was heated at a temperature of 150° C. for 14 hours. The resulting product was subsequently distilled under a pressure of 14 mm., most of the product distilling at a temperature of 80° C. at this pressure. The distillation apparatus was subsequently washed out with boiling benzene, and the washings were combined with the distillate. The combined distillate and washings were allowed to stand, and from this there was obtained a solid which was filtered and dissolved in petroleum ether and benzene and recrystallized therefrom. There was obtained 30.7 g. of substantially pure fumarodinitrile, M. P. 95° C. to 96° C. This represented a 73.5% conversion. The filtrate obtained by primary crystallization of the fumarodinitrile from the combined distillate and washings was analyzed for iodine, an average of 21.2% being obtained. This indicated that 19.5 g. of the distillate was di-iodoethylene. Allowing for the unreacted di-iodoethylene the yield of fumarodinitrile based on the di-halide actually consumed is 84.4%.

*Example 2*

An intimate mixture of 1 g. of p-(N-diethylamino)-biphenyl, 105.8 g. of cuprous cyanide and 150 g. of trans-di-iodoethylene was heated in a paraffin bath maintained at a temperature of from 100° C. to 145° C. for a period of five hours. The temperature was allowed to rise slowly to 185° C. and kept there for a period of 7 hours. At above 160° C. an exothermic reaction was noted. The resulting product was subjected to distillation under partial vacuum, and there was thus obtained 16.5 g. of substantially pure fumarodinitrile, B. P. 75° C. to 85° C. at 14 mm., which solidified in the receiving vessel. The distillate was subjected to an iodine and nitrogen analysis. Iodine analysis showed the presence of no iodine. Nitrogen analysis of the distillate indicated that it was substantially 100% fumarodinitrile. The total conversion of trans-di-iodoethylene to fumarodinitrile in this experiment was, accordingly, 41.8%. Unconverted di-iodoethylene may be recovered and reacted with a further quantity of cuprous cyanide and additional fumarodinitrile obtained.

Example 3

A mixture consisting of 1 cc. of tri-n-butyl-amine, 105.8 g. of cuprous cyanide and 150 g. of trans-di-iodoethylene was heated for 14 hours in a paraffin bath, which was maintained at a temperature of 155° C. to 160° C. The reaction mixture was then distilled under reduced pressure, and there was obtained a 64.5% conversion of trans-di-iodoethylene to fumarodinitrile. Analysis of the combined distillate and washings showed no presence of iodine.

Similarly favorable results are obtained by using other tertiary amines as catalysts in the preparation of fumarodinitrile from di-iodoethylene and cuprous cyanide, for example, diethylaniline, tri-isopropylamine, tri-isopropanolamine, etc. Up to 5% by weight of the amine may be advantageously employed. With greater concentrations of the amine, increasing decomposition of the fumarodinitrile occurs. Consequently, proportions comprising more than 5% by weight of the catalyst based on cuprous cyanide are of little value. A wide range of temperature may be used; however temperatures of above 180° C. are undesirable. At over 200° C. there occurs a side reaction which results in the formation of a colored decomposition product of fumarodinitrile. It is believed that at these higher temperatures there may occur a self-condensation or polymerization of fumarodinitrile which lowers the yield of the desired monomeric material. Molecular equivalents of the reactants, i. e., of the cuprous cyanide and di-iodoethylene, are advantageously employed; however, either one or the other of the two reactants may be employed in slight excess. While atmospheric conditions of pressure are preferably used, the reaction may be effected either at increased pressure or under partial vacuum. Distillation of the resulting product need not be carried out under a partial vacuum. However, I have found that fumarodinitrile tends to decompose somewhat at its boiling point when operating at ordinary pressure and, accordingly, I prefer to effect the distillation of the reaction mixture under partial pressure or by the use of steam.

As will be apparent to those skilled in the art, many variations of the process herein described with respect to reaction equipment and reaction conditions may be employed, the present invention being limited only by the appended claims.

What I claim is:

1. The process which comprises heating a mixture of di-iodoethylene and cuprous cyanide in the presence of a catalyst comprising a tertiary amine.

2. The process which comprises heating a mixture of di-iodoethylene and cuprous cyanide in the presence of a tertiary amine and recovering fumarodinitrile from the product.

3. The process which comprises heating a mixture of di-iodoethylene and cuprous cyanide in the presence of pyridine.

4. The process which comprises heating a mixture of di-iodoethylene and cuprous cyanide in the presence of tertiary butylamine.

5. The process which comprises heating to a temperature between 130° C. to 170° C. a mixture of substantially equal molecular quantities of di-iodoethylene and cuprous cyanide in the presence of from 1% to 5% by weight of a catalyst comprising a tertiary amine.

CARROLL A. HOCHWALT.